(12) United States Patent  
Futami (10) Patent No.: US 8,045,668 B2  
(45) Date of Patent: Oct. 25, 2011

(54) FRAME SYNCHRONIZATION APPARATUS AND ITS CONTROL METHOD

(75) Inventor: Tetsuhiro Futami, Kanagawa (JP)

(73) Assignee: Sony Corporation, Tokyo (JP)

( * ) Notice: Subject to any disclaimer, the term of this patent is extended or adjusted under 35 U.S.C. 154(b) by 678 days.

(21) Appl. No.: 12/136,821

(22) Filed: Jun. 11, 2008

(65) Prior Publication Data

US 2008/0310572 A1 Dec. 18, 2008

(30) Foreign Application Priority Data

Jun. 13, 2007 (JP) ................................ P2007-155940

(51) Int. Cl.
*H04L 7/00* (2006.01)

(52) U.S. Cl. ........ 375/371; 375/316; 375/354; 375/370; 375/355; 375/343; 375/346

(58) Field of Classification Search ................... 375/316, 375/354, 371, 370, 355, 343, 346
See application file for complete search history.

(56) References Cited

U.S. PATENT DOCUMENTS

| | | | | |
|---|---|---|---|---|
| 5,619,507 A * | 4/1997 | Tsuda | ............................ | 370/350 |
| 5,778,022 A | 7/1998 | Walley | | |
| 5,809,009 A * | 9/1998 | Matsuoka et al. | ............. | 370/206 |
| 6,154,482 A * | 11/2000 | Inuzuka | ......................... | 375/130 |
| 6,366,603 B1 * | 4/2002 | Uchida et al. | .................. | 375/136 |
| 6,493,396 B1 * | 12/2002 | Nguyen et al. | ................. | 375/279 |
| 7,139,333 B2 * | 11/2006 | Tanada et al. | .................. | 375/316 |
| 7,634,034 B2 * | 12/2009 | Larsson | ......................... | 375/362 |
| 7,801,255 B2 * | 9/2010 | Rasmussen | .................... | 375/343 |
| 2003/0043947 A1 * | 3/2003 | Zehavi et al. | .................. | 375/365 |
| 2005/0281318 A1 * | 12/2005 | Neugebauer | ................... | 375/134 |
| 2009/0207889 A1 * | 8/2009 | Kobayashi et al. | ........... | 375/142 |
| 2011/0019788 A1 * | 1/2011 | Shibata | ......................... | 375/371 |

FOREIGN PATENT DOCUMENTS

| | | |
|---|---|---|
| EP | 0 833 482 | 4/1998 |
| JP | 10 155004 | 6/1998 |

* cited by examiner

*Primary Examiner* — Kenneth Lam
(74) *Attorney, Agent, or Firm* — Frommer Lawrence & Haug LLP; William S. Frommer; Thomas F. Presson (57) ABSTRACT

A frame synchronization apparatus and method for controlling a frame synchronization process. The frame synchronization apparatus includes a correlation-value computation section; an IQ component select section; and a synchronization-signal outputting section. The correlation-value computation section computes a correlation value representing a correlation between a known delay wave detection series and a received delay wave detection series. The IQ component select selects a larger one of absolute values representing the amplitudes of I and Q. The synchronization-signal outputting section carries out a peak detection process to detect a peak in pieces of data arranged along a time axis to form a correlation-value series and output a frame synchronization signal for said input signal in accordance with a result of said peak detection process.

6 Claims, 6 Drawing Sheets

FRAME SYNCHRONIZATION APPARATUS AND ITS CONTROL METHOD

CROSS REFERENCES TO RELATED APPLICATIONS

The present invention contains subject matter related to Japanese Patent Application JP 2007-155940 filed with the Japan Patent Office on Jun. 13, 2007, the entire contents of which being incorporated herein by reference.

BACKGROUND OF THE INVENTION

1. Field of the Invention

The present invention relates to a frame synchronization apparatus and its control method. More particularly, the present invention relates to a frame synchronization apparatus capable of establishing a frame synchronization in a stable manner and in a short period of time and relates to a control method of the apparatus.

2. Description of the Related Art

In recent years, the hand phone technology and the radio digital transmission technology have been growing impressively. The radio digital transmission technology includes the digital broadcasting technologies such as the satellite and ground broadcasting technologies as well as the radio LAN (Local Area Network) technology. In comparison with the wire system, the radio digital transmission system is easily affected by the external environment such as the shape of the transmission route, buildings and the weather. It is thus necessary to establish a radio synchronization in a stable manner in an even worse transmission environment.

The radio synchronization cited above means a synchronization with a symbol timing, a synchronization with a frame timing and a synchronization with the frequency of a carrier. In synchronizations including and following a frame-timing synchronization, in general, a synchronization technology making use of a known signal inserted periodically into a transmitted signal is adopted widely.

In a poor transmission environment, by raising the power to transmit the known signal or lengthening the time to transmit the signal, the synchronization performance can be improved. If the transmission power of the known signal is raised or the transmission time of the known signal is lengthened, however, the power to transmit a data signal or the time to transmit the data signal decreases relatively in comparison with those of the known signal. Thus, the efficiency of the data transmission deteriorates.

Figure 1:
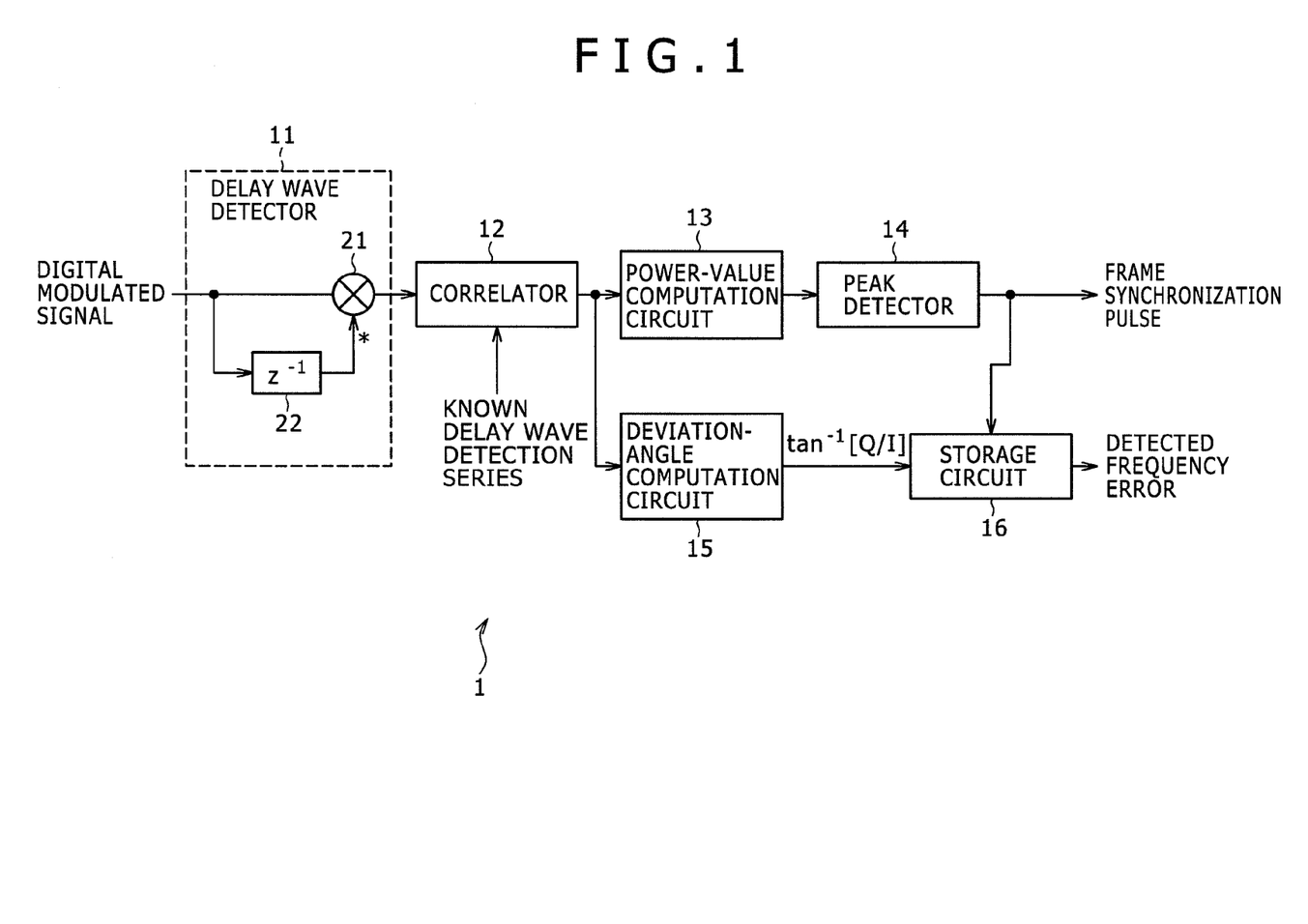
FIG. 1 is a block diagram showing the configuration of the existing frame synchronization circuit.

As a requirement raised by the background described above, there is a strong demand for implementation of synchronization technologies each capable of establishing a state of synchronization without much degrading the efficiency of the data transmission. Such synchronization technologies are disclosed in documents such as Japanese Patent Laid-open No. Hei 10-155004 (hereinafter referred to as Patent Document 1), Japanese Patent Laid-open No. Hei 10-190762 (hereinafter referred to as Patent Document 2), Japanese Patent Laid-open No. Hei 8-307408 (hereinafter referred to as Patent Document 3), Japanese Patent Laid-open No. Hei 6-252966 (hereinafter referred to as Patent Document 4). The synchronization technologies disclosed in the patent references can each be essentially represented by a frame synchronization circuit shown in FIG. 1. FIG. 1 is a block diagram showing the configuration of the existing frame synchronization circuit.

The existing frame synchronization circuit 1 shown in FIG. 1 includes a delay wave detector 11, a correlator 12, a power-value computation circuit 13, a peak detector 14, a deviation-angle computation circuit 15 and a storage circuit 16.

The delay wave detector 11 includes a processor 21 and a delay circuit 22. The processor 21 is a section for carrying out a complex multiplication process to multiply each current symbol in a received delay wave detection series by the complex conjugate of a symbol delayed by the delay circuit 22 from the current symbol by 1 symbol and supplying a product obtained as a result of the complex multiplication process to the correlator 12. The received delay wave detection series is a complex-symbol array of an input signal which is a digital modulated signal supplied by an external source to the delay wave detector 11 by way of an element such as an antenna or a RF (Radio Frequency) circuit. Provided at a stage preceding the delay wave detector 11, the antenna or the RF (Radio Frequency) circuit itself is not shown in the figure. In the following description, the product obtained as a result of the complex multiplication process is referred to as a received delay wave detection value.

The correlator 12 is a section for identifying a correlation between a received delay wave detection series and a known delay wave detection series and supplying a correlation value representing the identified correlation to the power-value computation circuit 13 and the deviation-angle computation circuit 15. The received delay wave detection series is a symbol array of the delay wave detection values received from the delay wave detector 11. The known delay wave detection series is defined as a symbol array of correct delay wave detection values of a known input series which is a symbol array of known values periodically inserted into the received signal. In the following description, the correct delay wave detection values of a known input series are also each referred to as a known delay wave detection value. The power-value computation circuit 13 provided at a stage following the correlator 12 is a section for computing a sum of the square of the I component of the correlation value and the square of the Q component of the correlation value to find an electric power to be supplied to the peak detector 14 provided at a stage following the power-value computation circuit 13. The peak detector 14 is a section for detecting a peak timing appearing in frame synchronization as the timing of the peak of the power and outputting a frame synchronization pulse in 1 symbol time segment with the peak timing.

Figure 2:
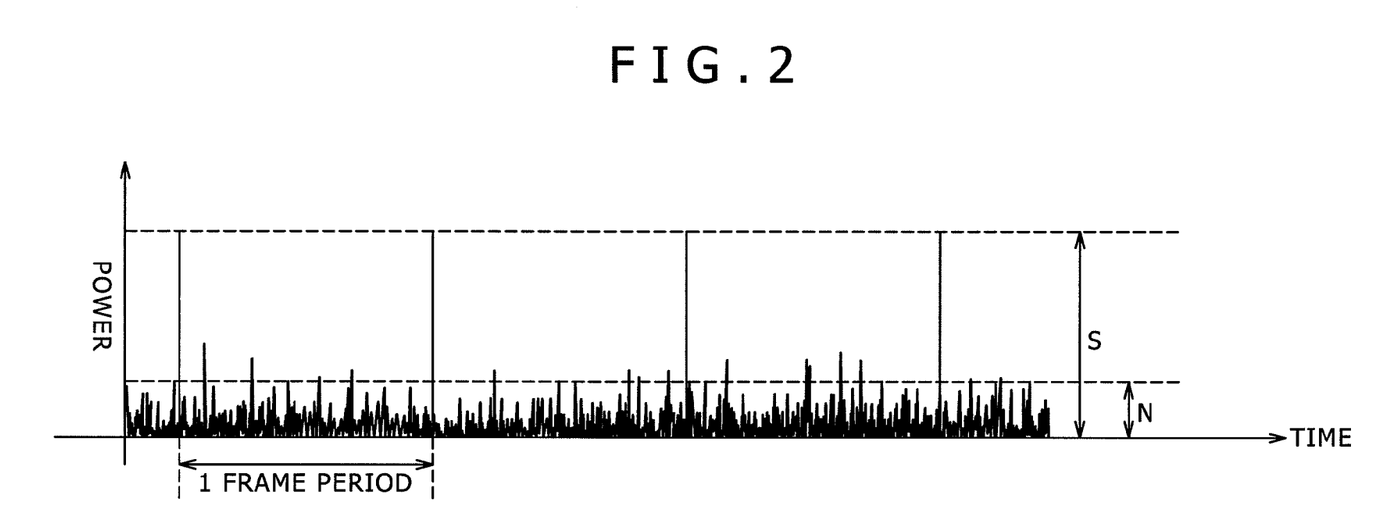
FIG. 2 is an explanatory diagram to be referred to in description of a peak detection process.

A process carried out by the peak detector 14 to detect the peak timing is explained by referring to FIG. 2 as follows. In FIG. 2, the vertical axis represents the power value whereas the horizontal axis represents the time. The larger the vertical-axis coordinate, the larger the power value. Time lapses in the right direction along the horizontal axis.

In the waveform shown in FIG. 2, a signal power S in a peak detection process is the power of a signal appearing with a peak timing whereas a noise power N in the peak detection process represents the variance of power variations occurring at times other than a time corresponding to the peak timing. The peak detector 14 detects the first peak timing and outputs a frame synchronization pulse in 1 symbol time segment with the peak timing. Thereafter, the peak detector 14 detects the second peak timing after 1 frame period following the first peak timing, the third peak timing after 1 frame period following the second peak timing and so on. That is to say, the peak detector 14 detects a peak timing for every frame period and outputs a frame synchronization pulse in 1 symbol time segment with the peak timing.

The reader is requested to refer back to FIG. 1. The deviation-angle computation circuit 15 is a section for finding a deviation angle which is defined as arctan (Q/I) where notations Q and I denote respectively the Q and I components of the correlation value output by the correlator 12. The deviation-angle computation circuit 15 supplies the deviation angle to the storage circuit 16. The deviation angle computed with the timing of the frame synchronization pulse is held in the storage circuit 16, which is a section for finding a difference between the frequency of the carrier and the local-oscillation frequency of the receiver apparatus as the output of the storage circuit 16. The difference between the frequency of the carrier and the local-oscillation frequency of the receiver apparatus is used for the purpose of eliminating a frequency error included in the received signal as follows: A reversed rotation with a phase rotation magnitude corresponding to the frequency difference is added to the received signal. It is to be noted, however, that this feature is not shown in the figure.

As described above, the existing frame synchronization circuit 1 shown in FIG. 1 carries out a delay wave detection process before determining a correlation. Thus, a fixed correlation output can be obtained even if a frequency error exists in the received signal to a certain degree. As a result, the frame synchronization circuit 1 is characterized in that a frame synchronization can be established in a stable manner. That is to say, since a phase rotation caused by the frequency error can be stopped by carrying out the delay wave detection process, same-direction phases are cumulatively added to each other in the correlation detection process so that a large correlation output can be obtained.

Next, the delay wave detection process is explained quantitatively by making use of a concrete mathematical expression.

A delay wave detection output is expressed by Eq. (1) given below. In the equation, notation $r_n$ denotes a received delay wave detection series, notation $\Delta f$ denotes the frequency error, notation T denotes the symbol period and notation $\theta_0$ denotes a phase shift generated in the transmission line and an analog circuit included in the transmitter apparatus.

$$r_n r_{n-1}^* = a_n e^{j(2\pi\Delta ft+\theta_0)} \cdot a_{n-1}^* e^{-j(2\pi\Delta f(t-T)+\theta_0)} \quad (1)$$
$$= a_n a_{n-1}^* e^{j2\pi\Delta fT} = a_n a_{n-1}^* e^{j\Delta\theta}$$

It is to be noted that, in Eq. (1), an equation of $\Delta\theta=2_{\pi\Delta}fT$ holds true. This expression represents a frequency error per symbol. In addition, if the BPSK (Binary Phase Shift Keying) technique is adopted as the modulation method and if the amplitude of the received signal is assumed to have been normalized to 1, an equation of an$=e^{jk\pi}$ (where k=0 or 1) holds true. Since $a_n a^*_{n-1}$ is also represented by an expression of $e^{jk'\pi}$ (where k'=0 or 1), the delay wave detection output can be expressed by a diagram of FIG. 3.

Figure 3:
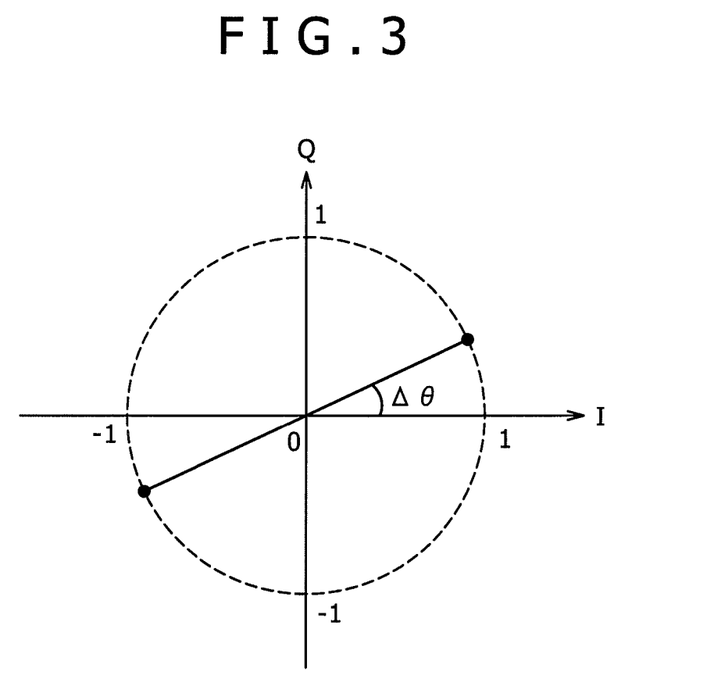
FIG. 3 is an explanatory diagram to be referred to in description of the output of a delay wave detector.

FIG. 3 is a diagram showing a mapping pattern on a complex plane of the delay wave detection output generated by the delay wave detector 11. In the following description, the complex plane is also referred to as an IQ plane. The I axis represents the I component representing the real part of a correlation value whereas the Q axis represents the Q component of the imaginary part of the correlation value. In the following description, the I and the Q axes are also referred to as the in-phase axis and the orthogonal axis respectively. On the IQ plane shown in FIG. 3, notation $\Delta\theta$ denotes a phase rotation angle generated due to the frequency error as a phase rotation angle per symbol.

That is to say, the received delay wave detection value has a phase rotated by $+\Delta\theta$ from the known delay wave detection value. The received delay wave detection value is a delay wave detection value between adjacent symbols in a received delay wave detection series, being a value delayed from the corresponding known delay wave detection value in the known delay wave detection series. The known delay wave detection value is a delay wave detection value in the known delay wave detection series.

Figure 4:
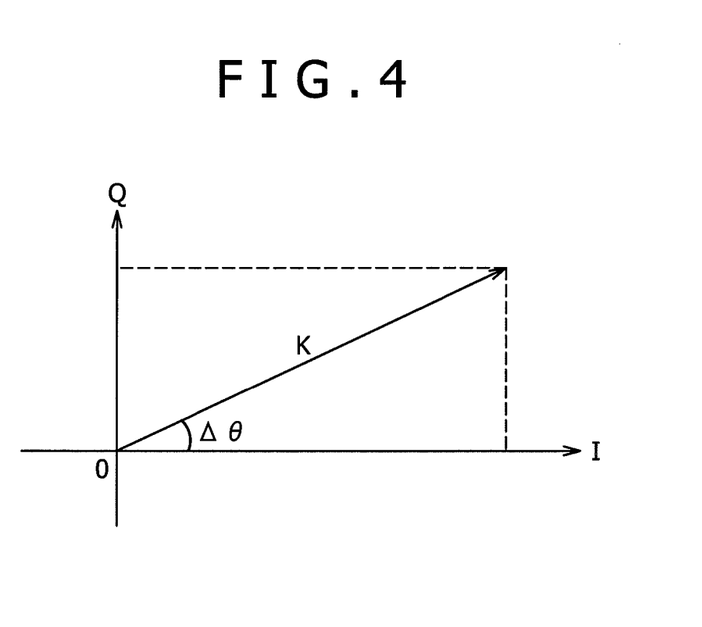
FIG. 4 is an explanatory diagram to be referred to in description of the output of a correlator.

In addition, in a known-signal time segment, the pattern of k' after the delay wave detection process is also known. Thus, by taking the pattern as the known delay wave detection series and identifying the correlation with the received delay wave detection series of the delay wave detection outputs, a correlation value of $Ke^{j\Delta\circ}$ at the peak timing can be obtained as shown in FIG. 4. Much like FIG. 3, FIG. 4 also shows the IQ plane. Notation K denotes a number obtained as a result of subtracting 1 from a known-symbol count inserted into the head of every frame of the input signal. The value of K is equal to the number of cumulative addition circuits used in the correlation processing. That is to say, the phase of the known delay wave detection value of the known delay wave detection series and the phase of the received delay wave detection value of the received delay wave detection series corresponding to the known delay wave detection series approach the same value as the value of $\Delta\theta$ decreases in such a way that, the smaller the value of $\Delta\theta$, the better the phases approach the same value. In addition, for small values of $\Delta\theta$, a positive correlation can also be said to be stronger.

As described above, in the existing frame synchronization circuit 1 shown in FIG. 1, the correlation value has a phase offset depending on the frequency error. By detecting a peak power value, however, the effect of the phase offset can be eliminated so that it is possible to establish a frame synchronization not dependent on the frequency error.

The existing frame synchronization circuit 1 shown in FIG. 1 executes frame synchronization control as explained above.

SUMMARY OF THE INVENTION

However, each of the existing technologies disclosed in Patent Document 1 to 4 listed above has a problem that, for a magnetic field with a small intensity, it is difficult to establish a frame synchronization in a stable manner and in a short period of time.

To put it in detail, let us assume that the power value of the correlation value is used in the frame synchronization process. In this case, the variance of the correlation power value can be expressed as follows: $\sigma_I^2+\sigma_Q^2=2\sigma^2$ where notation $\sigma_I^2$ ($=\sigma^2$) denotes the variance of the I component of the correlation value whereas notation $\sigma_Q^2$ ($=\sigma^2$) denotes the variance of the Q component of the correlation value. It is to be noted that, if the noise source is the source of the Gaussian noise, the noise is circularly symmetrical on the IQ plane. Thus, the noise power is 2 times that of a case in which a peak is detected by making use of only the I or Q component of the correlation value.

That is to say, under the condition that the magnitude $\Delta\theta$ of a phase offset caused by a frequency error is close to $\pm 0$ degree, $\pm 90$ degrees or $\pm 180$ degrees, the correlation value is a vector laid on the I or Q axis. Thus, in comparison with the case in which a peak is detected by making use of only the I or Q component of the correlation value, the SNR (the S/N ratio or the signal-to-noise ratio) deteriorates by 3 dB.

As a result, the limit of a receiver sensitivity allowing a frame synchronization to be established also deteriorates by 3 dB and this deterioration cannot be ignored in a contemporary digital transmission system required to be capable of establishing a frame synchronization in an electric field with an even smaller intensity. If compared with the case of a receiver electric field with the same intensity from another point of view, the obtained SNR deteriorates by 3 dB. Thus, the time it takes to establish a frame synchronization becomes longer. As a result, the time it takes to establish a radio synchronization or and a synchronization of transmitted data at a back end becomes longer. Thus, a problem is raised particularly in a transmission system required to function as a real-time transmission system. Such a problem is also raised even if the absolute value ($\sqrt{(I^2+Q^2)}$) of the correlation value is used in a frame synchronization process as is disclosed in patent document. 3 described above.

Addressing the problems described above, inventors of the present embodiment have innovated a frame synchronization apparatus capable of establishing a frame synchronization in a stable manner and in a short period of time even for a magnetic field with a small intensity.

In accordance with an embodiment of the present invention, there is provided a frame synchronization apparatus for controlling frame synchronization of an input signal. The frame synchronization apparatus includes:

a correlation-value computation section configured to compute a correlation value representing a correlation between a known delay wave detection series composed of a symbol array of known values inserted into the input signal and a received delay wave detection series composed of a symbol array obtained as a result of a signal detection process carried out on the input signal;

an IQ component select section configured to select the larger one of absolute values representing the amplitudes of I and Q components representing respectively the real and imaginary parts of the correlation value computed by the correlation-value computation section; and a synchronization-signal outputting section configured to carry out a peak detection process to detect a peak in pieces of data arranged along a time axis to form a correlation-value series composed of the absolute values each selected by the IQ component select section as the amplitude of the I or Q component and output a frame synchronization signal for the input signal in accordance with a result of the peak detection process.

The frame synchronization apparatus described above further includes:

a deviation-angle computation section configured to compute the deviation angle of the correlation value computed by the correlation-value computation section; and a frequency-error detection section configured to hold the deviation angles each computed by the deviation-angle computation section as the deviation angle of the correlation value observed with the timing of the frame synchronization signal output by the synchronization-signal outputting section, compute an average of the held deviation angles over frames the number of which is equal to a predetermined frame count at least equal to 1 frame and detect a frequency error included in the input signal from the average.

In the frame synchronization apparatus described above, the IQ component select section selects the I component for a relation of 0 degree$\leq|\Delta\theta|\leq$45 degrees or 135 degrees$\leq|\Delta\theta|<$180 degrees and selects the Q component for a relation of 45 degrees$<|\Delta\theta|<$135 degrees where notation $\Delta\theta$ denotes the frequency error per symbol.

In the frame synchronization apparatus described above, the known delay wave detection series is modulated by adoption of an n/2 shift BPSK (Binary Phase Shift Keying) method prior to insertion into the input signal.

In accordance with another embodiment of the present invention, there is provided a control method to be adopted by a frame synchronization apparatus for controlling a frame synchronization process carried out on an input signal. The control method includes the steps of:

computing a correlation value representing a correlation between a known delay wave detection series composed of a symbol array of known values inserted into the input signal and a received delay wave detection series composed of a symbol array obtained as a result of a signal detection process carried out on the input signal;

selecting the larger one of absolute values representing the amplitudes of I and Q components representing respectively the real and imaginary parts of the correlation value computed at the correlation-value computation step; and carrying out a peak detection process to detect a peak in pieces of data arranged along a time axis to form a correlation-value series composed of the absolute values each selected at the IQ component select step as the amplitude of the I or Q component and outputting a frame synchronization signal for the input signal in accordance with a result of the peak detection process.

In the frame synchronization apparatus according to the embodiment of the present invention and the frame synchronization method according to the other embodiment of the present invention, a correlation value representing a correlation between a known delay wave detection series composed of a symbol array of known values inserted into an input signal and a received delay wave detection series composed of a symbol array obtained as a result of a signal detection process carried out on the input signal is computed;

the larger one of absolute values representing the amplitudes of I and Q components representing respectively the real and imaginary parts of the correlation value is selected; and a peak detection process is carried out in order to detect a peak in pieces of data arranged along a time axis to form a correlation-value series composed of the absolute values each selected as the amplitude of the I or Q component and a frame synchronization signal is output for the input signal in accordance with a result of the peak detection process.

As described above, in accordance with the embodiments of the present invention, a frame synchronization can be established in a stable manner and in a short period of time.

BRIEF DESCRIPTION OF THE DRAWINGS

These and other objects and features of the present invention will become clear from the following description of the preferred embodiments given with reference to the accompanying diagrams, in which.

DETAILED DESCRIPTION OF THE PREFERRED EMBODIMENTS

Before preferred embodiments of the present invention are explained, relations between disclosed inventions and the embodiments are explained in the following comparative description. It is to be noted that, even if there is an embodiment described in this specification but not included in the following comparative description as an embodiment corresponding to an invention, such an embodiment is not to be interpreted as an embodiment not corresponding to an invention. Conversely speaking, an embodiment included in the following comparative description as an embodiment corresponding to a specific invention is not to be interpreted as an embodiment not corresponding to an invention other than the specific invention.

In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification or added in the future.

In accordance with an embodiment of the present invention, there is provided a frame synchronization apparatus (such as a frame synchronization circuit 51 shown in FIG. 5) for controlling frame synchronization of an input signal (such as a digital modulated signal). The frame synchronization apparatus includes:

a correlation-value computation section (such as a correlator 62 shown in FIG. 5) configured to compute a correlation value representing a correlation between a known delay wave detection series composed of a symbol array of known values inserted into the input signal and a received delay wave detection series composed of a symbol array obtained as a result of a signal detection process carried out on the input signal;

an IQ component select section (such as a IQ component select circuit 63 shown in FIG. 5) configured to select the larger one of absolute values representing the amplitudes of I and Q components representing respectively the real and imaginary parts of the correlation value computed by the correlation-value computation section; and a synchronization-signal outputting section (such as a peak detector 64 shown in FIG. 5) configured to carry out a peak detection process to detect a peak in pieces of data arranged along a time axis to form a correlation-value series composed of the absolute values each selected by the IQ component select section as the amplitude of the I or Q component and output a frame synchronization signal (such as a frame synchronization pulse) for the input signal in accordance with a result of the peak detection process.

The frame synchronization apparatus described above further includes:

a deviation-angle computation section (such as a deviation-angle computation circuit 65 shown in FIG. 5) configured to compute the deviation angle of the correlation value computed by the correlation-value computation section; and a frequency-error detection section (such as a storage circuit 66 shown in FIG. 5) configured to hold the deviation angles each computed by the deviation-angle computation section as the deviation angle of the correlation value observed with the timing of the frame synchronization signal output by the synchronization-signal outputting section, compute an average of the held deviation angles over frames the number of which is equal to a predetermined frame count at least equal to 1 frame and detect a frequency error included in the input signal from the average.

Figure 7:
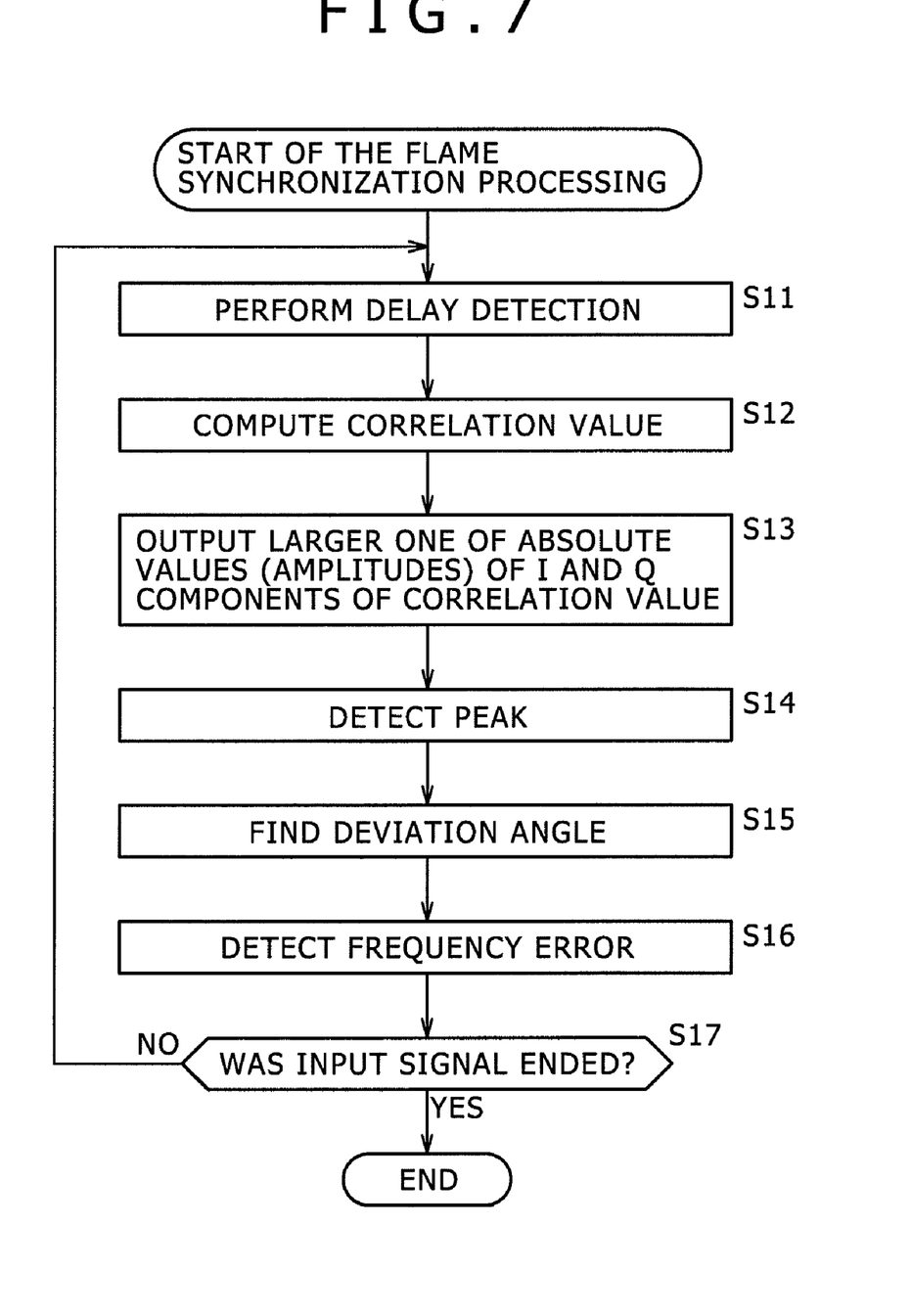
FIG. 7 shows a flowchart representing frame synchronization processing.

In the frame synchronization apparatus described above, the IQ component select section selects the I component for a relation of 0 degree$\leq|\Delta\theta|\leq$45 degrees or 135 degrees$\leq|\Delta\theta|<$180 degrees and selects the Q component for a relation of 45 degrees$<|\Delta\theta|<$135 degrees where notation $\Delta\theta$ denotes the frequency error per symbol (for example at a step S13 of a flowchart shown in FIG. 7).

In accordance with another embodiment of the present invention, there is provided a control method to be adopted by a frame synchronization apparatus (such as the frame synchronization circuit 51 shown in FIG. 5) for controlling a frame synchronization process carried out on an input signal. The control method includes:

a correlation-value computation step (such as a step S12 of the flowchart shown in FIG. 7) of computing a correlation value representing a correlation between a known delay wave detection series composed of a symbol array of known values inserted into the input signal and a received delay wave detection series composed of a symbol array obtained as a result of a signal detection process carried out on the input signal;

an IQ component select step (such as the step S13 of the flowchart shown in FIG. 7) of selecting the larger one of absolute values representing the amplitudes of I and Q components representing respectively the real and imaginary parts of the correlation value computed at the correlation-value computation step; and a synchronization-signal outputting step (such as a step S14 of the flowchart shown in FIG. 7) of carrying out a peak detection process to detect a peak in pieces of data arranged along a time axis to form a correlation-value series composed of the absolute values each selected at the IQ component select step as the amplitude of the I or Q component and outputting a frame synchronization signal for the input signal in accordance with a result of the peak detection process.

Next, preferred embodiments of the present invention are described by referring to diagrams as follows.

Figure 5:
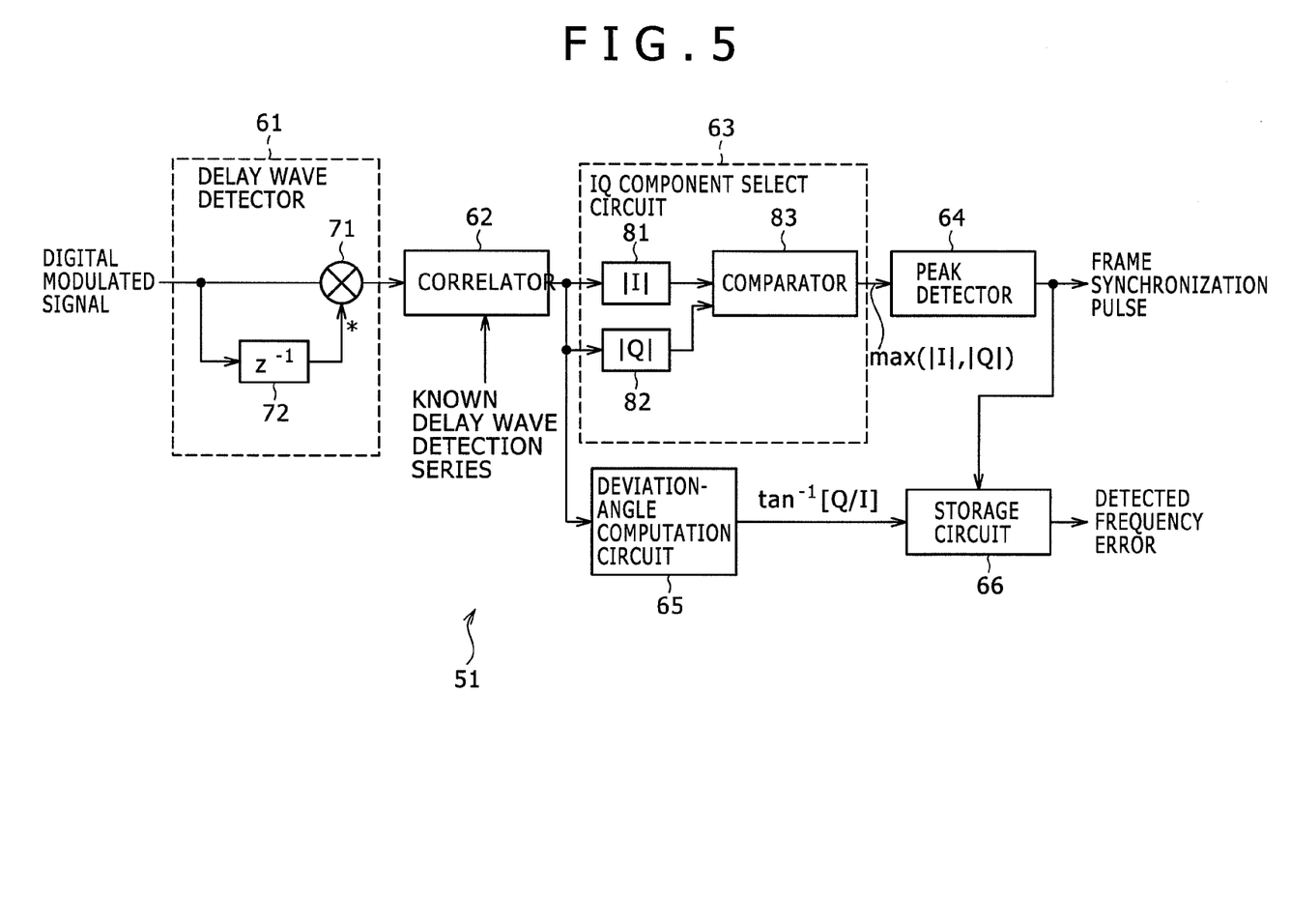
FIG. 5 is a block diagram showing the configuration of a frame synchronization circuit according to an embodiment of the present invention.

FIG. 5 is a block diagram showing the configuration of a frame synchronization circuit 51 according to an embodiment of the present invention.

The frame synchronization circuit 51 is a circuit for executing frame synchronization control. For example, the frame synchronization circuit 51 is included in a receiver apparatus for receiving a broadcast signal conforming to a DVB-S.2 standard and demodulating the signal. In the following description, such a broadcast signal is also referred to as an input signal or a received signal.

The DVB-S.2 standard is set forth by the ETSI (European Telecommunication Standardization Institute) and is a standard corresponding to an upper level of a DVB-S standard. In comparison with the DVB-S standard, the frequency utilization efficiency per unit frequency and the C/N ratio (the carrier-to-noise ratio) are improved by multi-value phase modulation and introduction of an LDPC (Low Density Parity Check) code or the like. In addition, in order to assure the synchronization performance even at a low C/N ratio, a PL (Physical Layer) header for transmitting transmitted information on a physical layer and a synchronization pilot signal are standardized and introduced. According to the DVB-S.2 standard, the PL header and the synchronization pilot signal are modulated in accordance with the π/2 shift BPSK technique prior to transmission.

The configuration of the frame synchronization circuit 51 shown in FIG. 5 includes a delay wave detector 61, a correlator 62, an IQ component select circuit 63, a peak detector 64, a deviation-angle computation circuit 65 and a storage circuit 66.

It is to be noted that, in comparison with the existing frame synchronization circuit 1 shown in FIG. 1, the frame synchronization circuit 51 shown in FIG. 5 includes the IQ component select circuit 63 in place of the power-value computation circuit 13. The remaining blocks of the frame synchronization circuit 51 are identical with their respective blocks of the existing frame synchronization circuit 1. To put it concretely, the delay wave detector 61, the correlator 62, the peak detector 64, the deviation-angle computation circuit 65 and the storage circuit 66 are identical with the delay wave detector 11, the correlator 12, the peak detector 14, the deviation-angle computation circuit 15 and the storage circuit 16 respectively. In other words, the frame synchronization circuit 51 shown in FIG. 5 is different from the existing frame synchronization circuit 1 shown in FIG. 1 only in that the IQ component select circuit 63 included in the frame synchronization circuit 51 replaces the power-value computation circuit 13 included in the existing frame synchronization circuit 1.

As shown in FIG. 5, the delay wave detector 61 serving as a section for carrying out a delay wave detection process includes a processor 71 and a delay circuit 72. As is obvious from what has been described earlier, the processor 71 is a section for carrying out a complex multiplication process to multiply each current symbol in a received delay wave detection series by the complex conjugate of a symbol delayed by the delay circuit 72 from the current symbol by 1 symbol and supplying a product obtained as a result of the complex multiplication process to the correlator 62. The result of the complex multiplication process is a received delay wave detection value obtained as a result of the delay wave detection process. The received delay wave detection series is a complex-symbol array of an input signal which is a digital modulated signal supplied by an external source to the delay wave detector 61 by way of an element such as an antenna or a RF (Radio Frequency) circuit. Provided at a stage preceding the delay wave detector 61, the antenna or the RF (Radio Frequency) circuit itself is not shown in the figure.

The correlator 62 is a section for identifying a correlation between the received delay wave detection series and a known delay wave detection series and supplying a correlation value representing the identified correlation to the IQ component select circuit 63 and the deviation-angle computation circuit 65. The received delay wave detection series is defined as a symbol array of the delay wave detection values received from the delay wave detector 61. The known delay wave detection series is a symbol array of correct delay wave detection values of a known input series which is a symbol array of known values periodically inserted into the input signal typically as a portion of the PL header or a synchronization pilot signal. In the following description, the correct delay wave detection values of a known input series are also each referred to as a known delay wave detection value.

The IQ component select circuit 63 is a section for selecting the larger one of the absolute values (or the amplitudes) of I and Q components of the correlation value received from the correlator 62 and supplying the selected absolute value of the component to the peak detector 64. As described earlier, the I component is the real part of the correlation value whereas the Q component is the imaginary part of the correlation value.

As shown in the figure, the IQ component select circuit 63 includes an I-component absolute-value outputting circuit 81, a Q-component absolute-value outputting circuit 82 and a comparator 83.

The I-component absolute-value outputting circuit 81 is a section for finding the absolute value of the I component (or the real part) of the correlation value received from the correlator 62 and supplying the absolute value to the comparator 83. On the other hand, the Q-component absolute-value outputting circuit 82 is a section for finding the absolute value of the Q component (or the imaginary part) of the correlation value received from the correlator 62 and supplying the absolute value to the comparator 83.

The comparator 83 is a section for receiving the absolute value of the I component of the correlation value from the I-component absolute-value outputting circuit 81 and the absolute value of the Q component of the correlation value from the Q-component absolute-value outputting circuit 82, comparing the absolute values with each other, selecting the larger one of the absolute values and outputting the selected absolute value representing the amplitude of the I or Q component to the peak detector 64. The larger absolute value (or the amplitude) of the I and Q components is denoted by notation max (|I|, |Q|) in the figure.

The peak detector 64 is a section for detecting a peak in a correlation-value series which is a series of pieces of data arranged along the time axis as correlation-value components which are each received from the comparator 83 included in the IQ component select circuit 63 as an I or Q component having the larger one of the absolute values (or the amplitudes) of the I and Q components. The timing of the detected peak is referred to as a peak timing appearing in a frame period. The peak detector 64 outputs a frame synchronization pulse for the input signal in 1 symbol time segment with the peak timing. The frame synchronization pulse is also supplied to the storage circuit 66.

The peak detection process carried out by the peak detector 64 included in the frame synchronization circuit 51 shown in FIG. 5 as described above is compared with the peak detection process performed by the peak detector 14 included in the existing frame synchronization circuit 1 shown in FIG. 1 as follows. In the waveform shown in FIG. 2, a signal power S in a peak detection process is defined as the power of a signal appearing with the peak timing whereas a noise power N in the peak detection process is defined as the variance of power variations occurring at times other than a time corresponding to the peak timing. The SNR in the existing peak detection process can be found in accordance with Eq. (2) given as follows:

$$SNR = \frac{S}{N} = \frac{K^2}{\sigma_I^2 + \sigma_Q^2} = \frac{K^2}{2\sigma^2} \qquad (2)$$

It is to be noted that, in Eq. (2) described above, notation K also shown in FIG. 4 denotes a number obtained as a result of subtracting 1 from a known-symbol count inserted into the head of every frame of the input signal, notation $\sigma_I$ denotes the variance of the I component whereas notation $\sigma_q$ denotes the variance of the Q component.

In the case of the present embodiment, on the other hand, if the signal power S and the noise power N are defined in the same way as Eq. (2), the method for computing the SNR in the peak detection process varies, depending on the magnitude of the frequency error $\Delta\theta$ per symbol as described below. In the following description, notation $|\Delta\theta|$ denotes the absolute value of the frequency error $\Delta\theta$ per symbol. For a relation of 0 degree$\leq|\Delta\theta|\leq$45 degrees or $|\Delta\theta|\leq$45 degrees and for a relation of 135 degrees$\leq|\Delta\theta|<$180 degrees, the SNR in the peak detection process is found in accordance with Eq. (3) to be described later. For a relation of 45 degrees<|Δθ|<135 degrees, on the other hand, the SNR in the peak detection process is found in accordance with Eq. (4) also to be described later.

That is to say, for a relation of 0 degree≦|Δθ|≦45 degrees or |Δθ|≦45 degrees and for a relation of 135 degrees≦|Δθ|≦180 degrees, the absolute values of the components of the correlation value satisfy a relation of |the I component|≧|the Q component| on the average. For this reason, the peak detection process is carried out mainly by making use of a series of I components. Thus, the SNR in the peak detection process can be found in accordance with Eq. (3) as follows:

$$SNR = \frac{S}{N} = \frac{|K\cos\Delta\theta|^2}{\sigma_I^2} = \frac{K^2}{\sigma^2}\cos^2\Delta\theta \quad (3)$$

For a relation of 45 degrees<|Δθ|<135 degrees, on the other hand, the absolute values of the components of the correlation value satisfy a relation of |the I component|<|the Q component| on the average. For this reason, the peak detection process is carried out mainly by making use of a series of Q components. Thus, the SNR in the peak detection process can be found in accordance with Eq. (4) as follows:

$$SNR = \frac{S}{N} = \frac{|K\sin\Delta\theta|^2}{\sigma_Q^2} = \frac{K^2}{\sigma^2}\sin^2\Delta\theta \quad (4)$$

It is to be noted that, much like Eq. (2), in Eqs. (3) and (4), notation K also shown in FIG. 4 denotes a number obtained as a result of subtracting 1 from a known-symbol count inserted into the head of every frame of the input signal, notation $\sigma_I$ denotes the variance of the I component whereas notation $\sigma_Q$ denotes the variance of the Q component.

Figure 6:
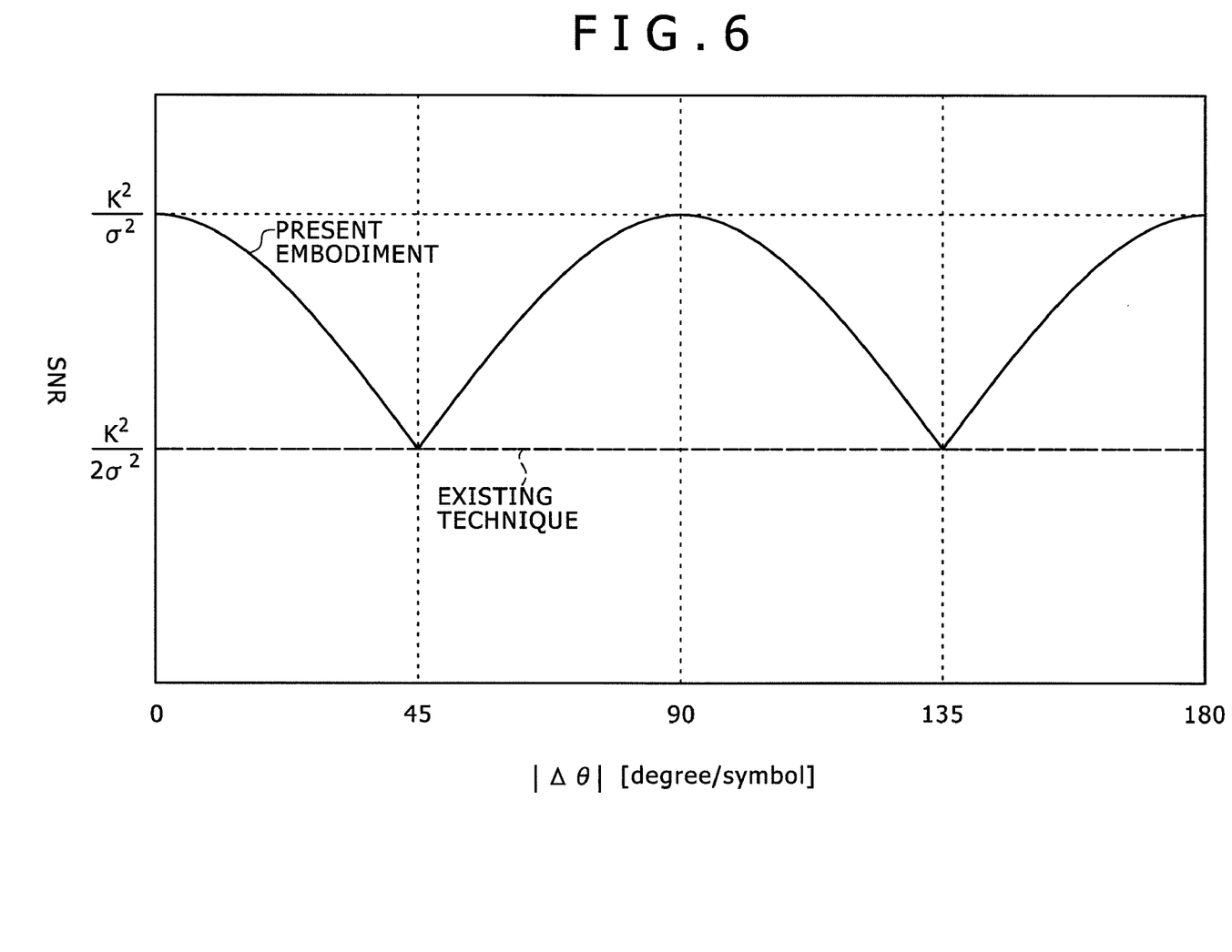
FIG. 6 is an explanatory diagram showing graphs to be referred to in description of an SNR improvement effect in a peak detection process according to the present embodiment.

The SNRs matching a variety of conditions can thus be computed in accordance with Eqs. (2) to (4) given above. The computed values of the SNRs are then plotted to result in graphs shown in FIG. 6. The vertical axis in FIG. 6 represents the SNR. The larger the vertical-axis coordinate, the smaller the noise power and, hence, the better the quality of the obtained signal. On the other hand, the horizontal axis in FIG. 6 represents the absolute value of the frequency error Δθ per symbol. Notation |Δθ| used in the figure denotes the absolute value of the frequency error Δθ per symbol. A point at a position on the right-hand side of the horizontal axis represents a larger absolute value |Δθ| of the frequency error Δθ per symbol than that of a point at a position on the left-hand side of the horizontal axis.

The dashed-line graph shown in FIG. 6 represents the SNR computed in accordance with Eq. (2) as the SNR in the existing peak detection process. On the other hand, the solid-line graph shown in FIG. 6 represents the SNR computed in accordance with Eq. (3) or (4) as the SNR in the peak detection process according to the present embodiment.

As is also obvious from Eq. (2), the dashed-line graph shown in FIG. 6 represents an SNR computed in the existing peak detection process as an SNR having a value which is constant without regard to the absolute value |Δθ| of the frequency error Δθ per symbol. Thus, the computed values of the SNR in the existing peak detection process are represented by the straight dashes-line graph parallel to the horizontal axis. That is to say, the computed values of the SNR in the existing peak detection process are always equal to $K^2/2\sigma^2$.

On the other hand, the solid-line graph shown in FIG. 6 represents the SNR computed in accordance with Eq. (3) as the SNR in the peak detection process according to the present embodiment for a relation of 0 degree≦|Δθ|≦45 degrees or |Δθ|≦45 degrees or for a relation of 135 degrees≦|Δθ|≦180 degrees and represents the SNR computed in accordance with Eq. (4) as the SNR in the peak detection process according to the present embodiment for a relation of 45 degrees<|ΔY|<135 degrees.

That is to say, a portion of the solid-line graph shown in FIG. 6 as a curve representing the SNR in the peak detection process according to the present embodiment is a cosine curve representing the SNR computed in accordance with Eq. (3) for a relation of 0 degree≦|Δσ|≦45 degrees or |Δθ|≦45 degrees. Thus, the SNR is equal to a maximum value of $K^2/\sigma^2$ at |Δθ|=0 degree. As |Δθ| increases, the value of the SNR decreases continuously to a minimum value of $K^2/2\sigma^2$ at |Δθ|=45 degrees. Another portion of the solid-line graph shown in FIG. 6 as a curve representing the SNR in the peak detection process according to the present embodiment is also a sinusoidal curve representing the SNR computed in accordance with Eq. (4) for a relation of 45 degrees<|Δθ|<135 degrees. The SNR is equal to the minimum value of $K^2/2\sigma^2$ at |Δθ|=45 degrees and, as |Δθ| increases, the value of the SNR increases again continuously to the maximum value of $K^2/\sigma^2$ at |Δθ|=90 degrees. Then, as |Δθ| further increases, the value of the SNR again decreases continuously to the minimum value of $K^2/2\sigma^2$ at |Δθ|=135 degrees. A further portion of the solid-line graph shown in FIG. 6 as a curve representing the SNR in the peak detection process according to the present embodiment is also a sinusoidal curve representing the SNR computed in accordance with Eq. (3) for a relation of 135 degrees<|Δθ|<180 degrees. The SNR is equal to the minimum value of $K^2/2\sigma^2$ at |Δθ|=135 degrees and, as |Δθ| increases, the value of the SNR increases again continuously to the maximum value of $K^2/\sigma^2$ at |Δθ|=180 degrees.

That is to say, the SNR in the peak detection process according to the present embodiment is a function of |Δθ|, having a value in a range of $K^2/2\sigma^2 \leq SNR \leq K^2/\sigma^2$. Thus, the SNR never becomes smaller than the existing SNR value of $K^2/2\sigma^2$. In addition, at |Δθ|=0, 90 and 180 degrees, the SNR reaches the maximum value of $K^2/\sigma^2$, which is 2 times the existing SNR value of $K^2/2\sigma^2$.

As described above, the dashed-line graph shown in FIG. 6 represents an SNR computed in the existing peak detection process as an SNR having a value which is constant without regard to the absolute value |Δθ| of the frequency error Δθ per symbol. On the other hand, the solid-line graph shown in FIG. 6 represents the SNR in the peak detection process according to the present embodiment, reaching the maximum value of $K^2/\sigma^2$, which is 2 times the existing SNR value of $K^2/2\sigma^2$ or an improvement of 3 dB over the existing SNR value.

The reader is requested to refer back to FIG. 5. The deviation-angle computation circuit 65 is a section for finding a deviation angle which is defined as arctan (Q/I) where notations Q and I denote respectively the Q and I components of the correlation value output by the correlator 62. The deviation-angle computation circuit 65 supplies the deviation angle to the storage circuit 66.

In addition to the deviation angle received from the deviation-angle computation circuit 65, the storage circuit 66 also receives a frame synchronization pulse from the peak detector 64 as described above. Thus, the deviation angle is held in the storage circuit 66 with the timing of the frame synchronization pulse. As an alternative, the storage circuit 66 finds an average of deviation angles computed for a plurality of frames. By holding the deviation angle or computing an average of deviation angles, the storage circuit 66 finds a difference between the frequency of the carrier and the local-oscillation frequency of the receiver apparatus as a frequency error. The frequency error which is a difference between the frequency of the carrier and the local-oscillation frequency of the receiver apparatus is the output of the storage circuit 66.

As described above, the storage circuit 66 may find an average of deviation angles computed for a plurality of frames. In this case, on the basis of an average deviation angle obtained by computing an average of correlation-value deviation angles each received with the timing of the output frame synchronization pulse over frames the number of which is equal to a predetermined frame count at least equal to 1 frame, the storage circuit 66 detects a frequency error as the output of the storage circuit 66.

As described above, in the frame synchronization circuit 51, the IQ component select circuit 63 selects the I or Q component of the correlation value received from the correlator 62 and supplies the absolute value of the selected component to the peak detector 64. The component selected by the IQ component select circuit 63 is a component having the larger absolute value (or the amplitude) of the I and Q components. The peak detector 64 detects a peak in a series of correlation values on the basis of the larger absolute value (or the amplitude) received from the comparator 83 as the larger absolute value (or the amplitude) of the I and Q components.

As a result, in comparison with the existing frame synchronization circuit 1 shown in FIG. 1 as a circuit for detecting a peak on the basis of the power value of the correlation value, the frame synchronization circuit 51 shown in FIG. 5 multiplies the SNR in the peak detection process by 2 or improves the SNR by 3 dB, depending on the frequency error.

Next, frame synchronization processing carried out by the frame synchronization circuit 51 shown in FIG. 5 is explained by referring to a flowchart shown in FIG. 7.

The flowchart shown in the figure begins with a step S11 at which the delay wave detector 61 carries out a delay wave detection process. To put it concretely, in the delay wave detection process carried out by the delay wave detector 61, the processor 71 carries out a complex multiplication process to multiply each current symbol in a received delay wave detection series of an input signal by the complex conjugate of a symbol delayed by the delay circuit 72 from the current symbol by 1 symbol and supplies a product obtained as a result of the complex multiplication process to the correlator 62. The result of the complex multiplication process is a received delay wave detection value obtained as a result of the delay wave detection process.

Then, at the next step S12, the correlator 62 computes a correlation value. To put it concretely, the correlator 62 identifies a correlation between a received delay wave detection series and a known delay wave detection series and supplies a correlation value representing the identified correlation to the IQ component select circuit 63.

Then, at the next step S13, the IQ component select circuit 63 selects the larger one of the absolute value of the I component of the correlation value received from the correlator 62 and the absolute value of the Q component of the correlation value, supplying the selected absolute value to the peak detector 64.

To put it concretely, for a relation of 0 degree≦|Δθ|≦45 degrees or |Δθ|≦45 degrees and for a relation of 135 degrees≦|Δθ|≦180 degrees, the IQ component select circuit 63 mainly outputs a series of I components to the peak detector 64. For a relation of 45 degrees≦|Δθ|<135 degrees, on the other hand, the IQ component select circuit 63 mainly outputs a series of Q components to the peak detector 64.

In other words, for a relation of 0 degree≦|Δθ|≦45 degrees or |Δθ|≦45 degrees and for a relation of 135 degrees≦|Δθ|<180 degrees, the IQ component select circuit 63 outputs a series of I components which are each the real part of the correlation value. For a relation of 45 degrees<|Δθ|<135 degrees, on the other hand, the IQ component select circuit 63 outputs a series of Q components which are each the imaginary part of the correlation value.

Then, at the next step S14, the peak detector 64 detects a peak of correlation values. To put it concretely, the peak detector 64 detects a peak in a correlation-value series which is a series of pieces of data arranged along the time axis as correlation-value components which are each received from the IQ component select circuit 63 as an I or Q component having the larger one of the absolute values (or the amplitudes) of the I and Q components. The timing of the detected peak is referred to as a peak timing appearing in a frame period. The peak detector 64 outputs a frame synchronization pulse for the input signal in 1 symbol time segment with the peak timing. The frame synchronization pulse is also supplied to the storage circuit 66.

Then, at the next step S15, the deviation-angle computation circuit 65 finds a deviation angle. To put it concretely, the deviation-angle computation circuit 65 finds the deviation angle which is defined as arctan (Q/I) where notations Q and I denote respectively the Q and I components of the correlation value output by the correlator 62. The deviation-angle computation circuit 65 supplies the deviation angle to the storage circuit 66.

Then, at the next step S16, the storage circuit 66 finds a frequency error. To put it concretely, with the timing of the frame synchronization pulse received from the peak detector 64, the storage circuit 66 holds the deviation angle received from the deviation-angle computation circuit 65 as an angle defined as arctan (Q/I) in order to detect a difference between the frequency of the carrier and the local-oscillation frequency of the receiver apparatus and output the difference in frequency as the frequency error.

It is to be noted that, in later processing, a reversed rotation with a phase rotation magnitude corresponding to the frequency error can be added to the received signal (or the input signal) in order to eliminate the frequency error included in the input signal.

Then, the flow of the frame synchronization processing goes on to the next step S17 in order to produce a result of determination as to whether or not the input signal has been ended. If the determination result produced at the step S17 indicates that the input signal has not been ended, the flow of the frame synchronization processing goes back to the step S11 in order to repeat the processes of the steps S11 to S16. As a matter of fact, the processes of the steps S11 to S16 are carried out repeatedly as long as the determination result produced at the step S17 indicates that the input signal has not been ended. As the determination result produced at the step S17 indicates that the input signal has been ended, the frame synchronization processing represented by the flowchart shown in FIG. 7 is completed.

As described above, in accordance with the frame synchronization circuit provided by the present embodiment, the IQ component select circuit selects an I or Q component having the larger one of the absolute values (or the amplitudes) of the I and Q components of a correlation value representing a correlation between a received delay wave detection series and a known delay wave detection series and outputs the absolute value (or the amplitude) of the selected I or Q component to the peak detector. The peak detector then detects a peak in a series of the I or Q components. Thus, in comparison with the existing frame synchronization circuit as a circuit for detecting a peak on the basis of the power value of the correlation value, the frame synchronization circuit multiplies the SNR in the peak detection process by 2 or improves the SNR by 3 dB, depending on the frequency error. As a result, the frame synchronization circuit 51 is capable of establishing a frame synchronization in a stable manner and in a short period of time even for a received magnetic field with a small intensity.

The present embodiment can be typically applied to a demodulation apparatus for demodulating a signal modulated in accordance with the DVB-S.2 standard and other systems each including such a demodulation apparatus. An example of the other apparatus is a satellite-broadcast receiving apparatus.

In addition, the present embodiment can also be applied to a demodulation apparatus for demodulating a signal modulated in accordance with a variety of transmission-line standards other than the DVB-S.2 standard and other systems each including such a demodulation apparatus.

It is also worth noting that, in this specification, the steps each included in the flowchart described above as a step describing a program stored in a recording medium can be carried out not only in a pre-prescribed order along the time axis, but also concurrently or individually.

It is also to be noted that the technical term 'system' used in this specification implies the configuration of a confluence including a plurality of apparatus.

On top of that, the scope of the present invention is by no means limited to the embodiment described above. That is to say, the embodiment can be changed to a variety of versions within a range not departing from the essentials of the present invention.

In addition, it should be understood by those skilled in the art that a variety of modifications, combinations, sub-combinations and alterations may occur, depending on design requirements and other factors as far as they are within the scope of the appended claims or the equivalents thereof.

What is claimed is:

1. A frame synchronization apparatus for controlling a frame synchronization process carried out on an input signal, said frame synchronization apparatus comprising:
   a correlation-value computation section configured to compute a correlation value representing a correlation between a known delay wave detection series composed of a symbol array of known values inserted into said input signal and a received delay wave detection series composed of a symbol array obtained as a result of a signal detection process carried out on said input signal;
   an IQ component select section configured to select a larger one of absolute values representing amplitudes of I and Q components representing respectively the real and imaginary parts of said correlation value computed by said correlation-value computation section; and
   a synchronization-signal outputting section configured to carry out a peak detection process to detect a peak in pieces of data arranged along a time axis to form a correlation-value series composed of said absolute values each selected by said IQ component select section as the amplitude of said I or Q component and output a frame synchronization signal for said input signal in accordance with a result of said peak detection process.

2. The frame synchronization apparatus according to claim 1, said frame synchronization apparatus further comprising:
   a deviation-angle computation section configured to compute a deviation angle of said correlation value computed by said correlation-value computation section; and
   a frequency-error detection section configured to hold said deviation angles each computed by said deviation-angle computation section as the deviation angle of said correlation value observed with a timing of said frame synchronization signal output by said synchronization-signal outputting section, compute an average of said held deviation angles over frames the number of which is equal to a predetermined frame count at least equal to 1 frame, and detect a frequency error included in said input signal from said average.

3. The frame synchronization apparatus according to claim 1 wherein said IQ component select section selects said I component for a relation of 0 degree$\leqq|\Delta\theta|\leqq$45 degrees or 135 degrees$\leqq|\Delta\theta|\leqq$180 degrees and selects said Q component for a relation of 45 degrees$\leqq|\Delta\theta|<$135 degrees where notation $\Delta\theta$ denotes said frequency error per symbol.

4. The frame synchronization apparatus according to claim 1 wherein said known delay wave detection series is modulated by adoption of an $\pi/2$ shift Binary Phase Shift Keying method prior to insertion into said input signal.

5. A control method to be adopted by a frame synchronization apparatus for controlling a frame synchronization process carried out on an input signal, said control method comprising the steps of:
   computing a correlation value representing a correlation between a known delay wave detection series composed of a symbol array of known values inserted into said input signal and a received delay wave detection series composed of a symbol array obtained as a result of a signal detection process carried out on said input signal;
   selecting a larger one of absolute values representing amplitudes of I and Q components representing respectively real and imaginary parts of said correlation value computed at said correlation-value computation step; and
   carrying out a peak detection process to detect a peak in pieces of data arranged along a time axis to form a correlation-value series composed of said absolute values each selected at said IQ component select step as the amplitude of said I or Q component and outputting a frame synchronization signal for said input signal in accordance with a result of said peak detection process.

6. A frame synchronization apparatus for controlling a frame synchronization process carried out on an input signal, said frame synchronization apparatus comprising:
   correlation-value computation means for computing a correlation value representing a correlation between a known delay wave detection series composed of a symbol array of known values inserted into said input signal and a received delay wave detection series composed of a symbol array obtained as a result of a signal detection process carried out on said input signal;
   IQ component select means for selecting a larger one of absolute values representing amplitudes of I and Q components representing respectively real and imaginary parts of said correlation value computed by said correlation-value computation section; and
   synchronization-signal outputting means for carrying out a peak detection process to detect a peak in pieces of data arranged along a time axis to form a correlation-value series composed of said absolute values each selected by said IQ component select section as the amplitude of said I or Q component and outputting a frame synchronization signal for said input signal in accordance with a result of said peak detection process.

* * * * *